UNITED STATES PATENT OFFICE 2,266,326

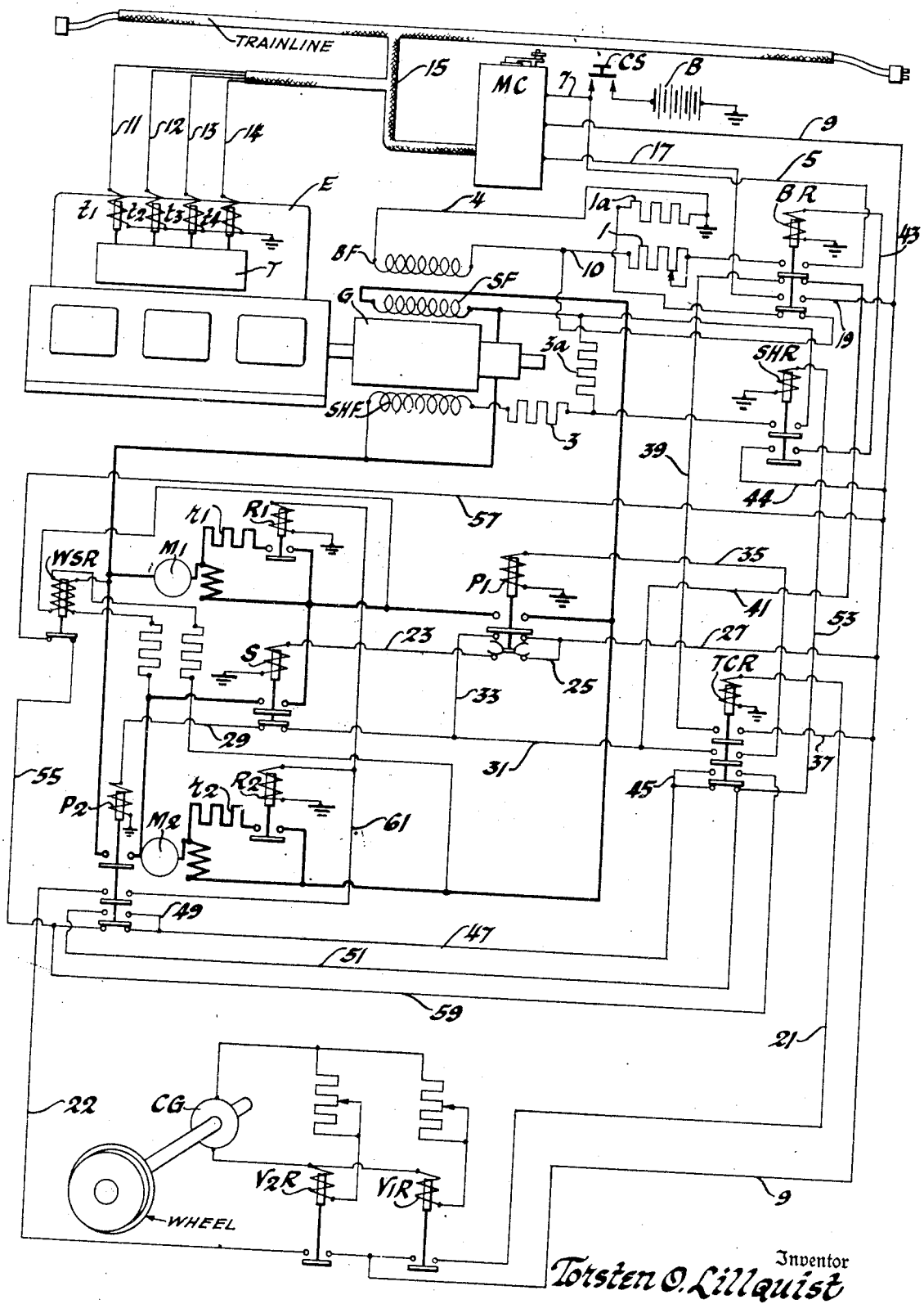

ELECTRICAL TRANSITION CONTROL SYSTEM

Torsten O. Lillquist, Clarendon Hills, Ill., assignor to General Motors Corporation, Detroit, Mich., a corporation of Delaware Application October 30, 1940, Serial No. 363,543

13 Claims. (Cl. 290—17)

The present invention relates, generally, to generating electric traction systems for vehicles and more particularly a control system therefor, whereby transition of the traction motor connections is automatically accomplished by means responsive to the speed of the vehicle.

Conventional transition control systems are either manually controlled or controlled automatically, usually by means responsive to the voltage and/or current demand of the motors.

With the manually controlled systems it is seldom that the operator is able to judge when transition should be made to prevent overloading or underloading of the power source, which on vehicles is usually a prime mover driven generator. When transition of the connections is made at other than the proper value of vehicle speed and load, excessive current surges occur which impose excessive mechanical and electrical stresses on the power units.

With the systems controlled by automatic means responsive to voltage and/or current values in the power circuits, variations in the external load on the motors cause rapid changes in voltage and current in the power circuits, which results in recurrent operation of the control means and hence transfer and retransfer of the motor connections between the series and parallel motor connections, imposing recurrent electrical and mechanical stresses on the control and power units.

On locomotives where different tonnage trains are pulled and where the external load varies widely and suddenly, various modifications of the above mentioned control systems have been resorted to in an attempt to overcome the difficulties of each of these systems. With the manually operable system it has been found that by providing load indicating means the locomotive engineer is better able to judge when transition should be made, but in some instances he is unable to actuate the controls quickly enough to prevent overloading, underloading, or shocks on the power units, and also he may be occupied with other duties or disregard the indicating means provided. With the automatic control systems manual lock-out means are sometimes provided to render the automatic means inoperative to stop hunting of the automatic control means, but when the automatic means are thus made inoperative, the operator's judgment must again be relied upon to accomplish transition, and accordingly, the same difficulties are present as outlined above with the control system which is operated solely by manually operable means.

The principal object of the present control system is the provision of simple, inexpensive and fully automatic transition control means responsive only to vehicle speed for causing the transfer and retransfer of the motor connections between a connection providing high torque and low speed motor characteristics and a connection providing high speed and reduced torque motor characteristics without overloading or underloading and without imposing electrical and mechanical stresses on the power units.

Another object is the provision of means for reducing the power supplied to the motors only when transition between the connection providing high torque, low speed motor characteristics and the connection providing high speed, reduced torque characteristics is accomplished by the means responsive to the speed of the locomotive and/or means responsive to differential speed of the traction motors.

The means by which the above mentioned objects are accomplished and other advantages provided by these means will be better understood by referring to the following detailed description of this improved automatic control system and the single accompanying diagrammatic drawing showing the control system applied to a generating electric traction system for a locomotive, for which it is particularly adapted. However, it is capable of other applications.

Referring now to the drawing, the generating electric traction system comprises a pair of traction motors M1 and M2 and a power source therefor, which includes a prime mover driven generator G, the prime mover E being shown as a Diesel engine; however, any other type of prime mover may be used. Power circuit connections, shown in heavy lines, and contactors S, P1 and P2 comprise conventional connection changing or transition means by which the motors M1 and M2 may be connected either in a high torque, low speed series relation or a high speed, reduced torque parallel relation with the power source.

The motors M1 and M2 are shown as conventional series type traction motors which may be operatively connected in any well known manner to drive individual axles or driving wheels of the locomotive, not shown. Motor field shunting resistors r1 and r2 are provided to reduce the excitation of the motors in the usual manner in order to obtain high operating speed characteristics from the motors, and relays R1 and R2 are provided to connect the resistors r1 and r2 in shunt relation with the motor fields. The above means constitute motor excitation and speed varying means.

A wheel slip relay WSR is provided which acts in response to slight differences in speed of the motors which cause corresponding differences in the back voltage generated by the motors to reduce the power output of the engine and generator and hence the power supplied to the motors to prevent wheel slippage. This relay comprises two differential or opposed windings, each of which is connected, as shown, in series with a suitable resistor. The connections shown between the power conductors and each of the windings and resistors are arranged so that upon upward movement of the armature of the series contactor S1 which connects the motors in series, each winding of the relay will be connected across a separate motor armature, and any slight difference in speed or voltage generated by the respective motor armatures will cause different values of current in the relay windings to cause upward movement of the relay armature out of bridging relation with the fixed relay contacts shown. Upward movement of the relay armature out of bridging relation with the fixed contacts controls means about to be described whereby the power output of the generator and engine and therefore the input to the motors will be reduced. It will be evident that with the relay windings connected as shown, upward movement of the armatures of the parallel contactors P1 and P2 to connect the motors in parallel with the generator shunts the relay windings, for reasons to be described later.

The generator G is shown directly connected to and driven by the Diesel engine prime mover E, the engine and generator constituting the power source for the motors M1 and M2. Output regulating means for the power source is provided so that the power supply to the motors may be regulated. This means comprises generator excitation varying means and engine fuel regulating means to vary the speed and torque of the engine.

Excitation of the generator is accomplished by providing a shunt field winding SHF, a separately excited field winding BF and a series field winding SF, which cooperate to give inherent output regulation of the generator. The generator excitation varying means comprises field resistors shown at 1, 1a, 3 and 3a and relays BR and SHR. One terminal of the separately excited field winding BF is connected to a grounded conductor 4 and the other terminal of this winding is shown connected to one terminal of the field resistor 1, the other terminal of which is shown connected to one of the upper contacts of the relay BR and the other upper contact of which is shown connected to a control switch CS by a conductor 5. The other terminal of the switch CS is connected to one terminal of a battery B, the other terminal being grounded as indicated. A conductor 7 connects the conductor 5 to a master controller MC. When the control switch CS is moved from the open position, as shown, to the closed position, the master controller is connected to the battery B by the conductor 7, and the separately excited field is energized through conductor 5 to increase the generator output only when the upper pair of contacts of the relay BR are bridged. The resistor 1a serves as a discharge resistor when the upper pair of fixed contacts of relay BR are opened, and the lower pair are bridged as shown, as the resistor 1a is shown connected in series with the lower pair of relay contacts across the separately excited field winding BF, and when the lower contacts are bridged, the resistor 1a is connected in shunt relation with this field winding to limit the current induced therein, upon its being disconnected from the battery by the opening of the upper pair of contacts. It is evident that when this separately excited field winding is de-energized, the generator output will be greatly reduced. The resistors 3 and 3a are shown connected in series with the shunt field winding SHF. The upper pair of fixed contacts of relay SHR are connected in shunt relation with the resistor 3a so that when these contacts are bridged by an armature contact of this relay the resistor 3a will be shunted to increase the excitation current in the shunt field winding, which will cause an increase in the generator output. The resistor 3a also serves as a discharge resistor to limit the current induced in the shunt field winding, being inserted in the shunt field circuit to reduce the excitation current and therefore the generator output when the upper pair of contacts of the relay SHR are opened.

The engine E has any well known type of means for regulating the fuel supplied thereto shown generally at T, and comprises electromagnetically actuated plunger devices t1 to t4 operatively connected in any well known manner to the conventional fuel regulating device of the engine. Energization and de-energization of the electromagnetic windings in various combinations are controlled by the master controller MC when moved from a position corresponding to idling speed of the engine to various other positions corresponding to increasing values of engine speed, torque and therefore power output in a well known manner. The controller is designed so that when moved from a position in which the fuel supply to the engine is such that the engine runs at idling speed, the conductor 7 will be connected to a positive control bus 9, which will be referred to later. Each of the electromagnetic actuating windings of the fuel regulating means T has one terminal grounded, each of the other terminals being connected to the controller by individual conductors numbered 11 to 14 shown entering a conduit 15. Train line conductors, not shown, are connected in parallel with each of the conductors 11 to 14 and are carried in the conduit 15 and a train line conduit indicated, whereby other locomotives having engines provided with similar fuel regulating means may be connected in parallel with these train line conductors and controlled in multiple from any master controller MC on any of the locomotives in a well known manner.

The master controller MC is designed so that when moved to a given position all of the windings of the devices t1 to t4 are energized to obtain maximum output of the engine. Excitation current for one of these windings, however, is supplied through conductor 17 connecting the master controller with one of the pair of fixed contacts second from the bottom of relay BR, the other fixed contact of which is connected by a conductor 19 to the positive control bus 9 so that it is necessary that this pair of contacts of this relay be bridged by an armature contact and that the controller be in this given position in order to cause the engine to run at maximum output. With the controller in this position and the armature contact of the relay BR out of contact with these contacts, as shown, the connection between the conductors 17 and 19 is broken, and one of these windings is de-energized, the remaining windings being supplied with battery current through conductor 7, and therefore only lower output values from the engine may be obtained even though the controller is in the position corresponding to maximum engine output.

The contactors and relays referred to above are shown provided with fixed contacts and contacts on their armatures movable into or out of bridging relation with the fixed contacts when the electromagnetic windings thereof are energized. The contactor and relay armatures with their attached contacts are shown in their depressed or normal position with their windings de-energized. Upon energization of these windings the armatures are attracted and moved upward. The upper pair of fixed contacts and the upper armature contact on each of the contactors S, P1 and P2, shown larger than the other contacts, are power contacts, these fixed power contacts being connected by power conductors, shown in heavy lines, extending between the generator G and motors M1 and M2. When the winding of contactor S is energized the fixed power contacts will be bridged by the armature power contact to connect the motors in series with the generator for obtaining high torque at low speeds, and when the winding of the contactor S is de-energized and the windings of both the contactors P1 and P2 are energized the fixed power contacts thereof are bridged by the armature power contacts to connect the motors in parallel with the generator G for obtaining high speed and reduced torque. The lower fixed contacts of the contactors and the fixed contacts of the relays are interlocking and control contacts which are connected by interlocking and control conductors, shown by lighter lines, by which the energization of the windings of the contactors and relays is controlled in the proper combination and sequence by speed responsive control means.

The speed responsive control means shown includes a control generator CG, such as the conventional speedometer or train control generator provided on the locomotive, voltage relays V1R and V2R and a control relay TCR. The generator CG is shown driven by one of the wheels of the locomotive, preferably an idle or non-driven wheel. The voltage output of this generator is directly proportional to the speed of the wheel and, therefore, the speed of the locomotive. The voltage relays V1R and V2R each have a pair of fixed contacts and an armature contact movable into bridging relation with the fixed contacts when a given value of voltage is supplied to the actuating winding shown. Each of these windings is connected across the terminals of the control generator CG, suitable variable resistors being shown which are connected in series with the winding to cause the armature of relay V1R to move upward into bridging contact with its fixed contacts at a vehicle speed of 35 miles per hour and to drop to the normal position shown at 30 miles per hour, and to cause the armature of relay V2R to bridge its contacts at 90 miles per hour and fall to the normal position shown at 75 miles per hour. One of the fixed contacts of each of these relays is connected to the positive control bus 9. The other contact of the relay V1R is connected to the winding of the control relay TCR by a conductor 21 to control energization thereof from the battery so that the armature and contacts thereon will be moved upward from the normal position shown into and out of bridging relation with certain of the fixed contacts of this relay which are interconnected to the contactors and relays referred to above. The other contact of the relay V2R is connected by a conductor 22 to the upper left interlocking contact of contactor P2 to connect the battery therewith upon upward movement of the armature of relay V2R.

The interlocking and control conductors connecting the various relays and contactors to the battery will now be described in detail. The windings of all the contactors and relays with the exception of the wheel slip relay WSR and voltage relays V1R and V2R, have one terminal connected to ground as shown, and their other terminals connected as follows: The winding of the contactor S which establishes the high torque and low speed or series motor connection with the generator is connected to the left lower interlocking contact of the contactor P1 by a conductor 23, the two right interlocking contacts of which are interconnected by a conductor 25, a conductor 27 interconnecting the conductor 25 with the positive control bus 9. The winding of the contactor P2 is connected by a conductor 29 to the left interlocking contact of contactor S, the right interlocking contact of which is connected to the second contact from the top on the left of relay TCR by a conductor 31. A jumper conductor 33 interconnects the conductor 31 and the upper left interlocking contact of contactor P1. The winding of the contactor P1 is connected by a conductor 35 to the second contact on the right from the top of relay TCR. The upper right contact of the relay TCR is connected to the positive control bus 9 by a conductor 37 and the upper left contact is connected by a conductor 39 to the left contact second from the top of relay BR, and the right contact second from the top of the relay BR is connected by a jumper conductor 41 to the conductor 31. The winding of the relay BR is connected by a conductor 43 to the lower right contact of the relay SHR, the lower left contact of which is connected to the positive control bus 9 by a conductor 44. The two lower left contacts of the control relay TCR are interconnected by a conductor 45 which is connected by a conductor 47 to a conductor 49 interconnecting the two lower right interlocking contacts of the contactor P2. The second interlocking contact from the top on the left of contactor P2 is connected by a conductor 51 to the right lower contact of relay TCR, which is also connected to the winding of the relay SHR by a conductor 53. The left lower contact of contactor P2 is connected by a conductor 55 to one contact of the wheel slip relay WSR, the other contact of which is connected by a conductor 57 to the positive bus 9. The conductor 55 is interconnected by a conductor 59 to the right contact second from the bottom of the relay TCR. A conductor 61 serves to connect the windings of relays R1 and R2 to the right upper interlocking contact of the contactor P2, the left upper contact of which, as has been mentioned previously, is connected by the conductor 22 to the voltage relay V2R.

The sequence of operation of the control system with the control switch CS, contactors, and relays in their normal position as shown, and with the master controller in a position to cause the engine to run at idling speed, is as follows:

Closure of the control switch connects conductors 5 and 7 to the battery. Movement of the master controller MC from the idle position to increase the engine speed and torque causes energization of certain of the windings of the electromagnetic devices shown at $t1$ to $t4$ through the conductor 7, and also causes the positive control bus 9 to be connected to the conductor 7. The winding of the contactor S is accordingly connected between ground and the positive bus 9 by conductors 23, 25 and 27, and the winding of relay SHR is connected between ground and the positive bus 9 by conductors 53, 47, 55, and 57, to cause upward movement of the armatures of the contactor S and relay SHR. Upward movement of the armature contacts of the contactor S to bridge the power contacts connects the motors M1 and M2 so that high torque and low speed characteristics are obtained, that is, in series with the generator, and causes the interlocking contacts to be opened, breaking the connection between conductors 29 and 31, the former being attached to the winding of contactor P2 to prevent energization thereof. Movement of the armature contacts of the relay SHR upward into bridging relation with both pairs of fixed contacts shunts the shunt field discharge resistor $3a$ to increase the excitation of the shunt field SHF and at the same time causes the winding of relay BR to be energized through conductors 43, 44 and 9 to cause upward movement of its armature contacts into bridging relation with the upper pair of contacts and also the pair of fixed contacts second from the bottom. Bridging of the upper pair of contacts of the relay BR connects the separately excited field winding BF to the conductor 5 to cause energization thereof from the battery, and bridging of the pair of contacts second from the bottom connects the master controller MC to the positive control bus 9 through conductors 17 and 19 so that when the master controller is moved to a position corresponding to maximum speed and output of the engine all of the windings of the electromagnetic devices $t1$ to $t4$ may then be energized to increase the speed and torque and therefore the output of the engine to its maximum value.

Assume that the controller is now moved to this position; the increased output of the engine due to the increase in fuel supplied thereto, plus the increase in excitation of the shunt, separate and series field windings, causes high values of current to flow in the motors to give high starting torque. Should any of the driving wheels, not shown, driven by the motors M1 or M2 start to slip, the back voltage generated by the motor driving the slipping wheel will increase, which causes more current to flow in one of the differential windings of the wheel slip relay causing its armature to move upward to break the circuit between conductors 55 and 57 through which the winding of the relay SHR is energized. This causes the armature of relay SHR to drop, opening the connection between conductors 43 and 44 through which the winding of relay BR is energized. The armatures of the relays BR and SHR will both accordingly drop down to the normal position in which they are shown, reducing the output of the power source by disconnecting the conductors 17 and 19 through which the winding of one of the devices $t1$ to $t4$ is energized to obtain maximum engine output, thus reducing the engine output and at the same time reducing the generator excitation and output by the insertion of the discharge resistors $1a$ and $3a$ in the shunt and separately excited field circuits, respectively, and disconnecting the separately excited field from the battery, as described previously. The reduced power output of the power source, and therefore the decrease in current supplied to the motors, instantly stops slippage of the driving wheels of the locomotive, and the armature of the wheel slip relay therefore again drops down to the position shown, which reestablishes the above described circuits broken by upward movement of this armature, to again cause energization of the windings of the relays SHR and BR and the windings of the engine fuel regulating device T through conductors 17 and 19, thus again increasing the output of the power source to the maximum value.

Transition from the high torque low speed or series motor connection to a parallel motor connection to effect higher speed operation and reduced torque from the motors and locomotive takes place at 35 miles per hour. At this speed the armature of the voltage relay VIR moves upward, as the current through its winding is then at a value proportional to the voltage of the control generator which is proportional to this 35 mile per hour value of locomotive speed. The conductors 9 and 21 are therefore connected together, which causes energization of the winding of the control relay TCR and upward movement of the armature thereof, causing the contacts of its armature to open the lower pair of fixed contacts and bridge the upper three pairs of fixed contacts. Opening of the lower contacts breaks the connection between conductors 47 and 53 causing de-energization of the winding of the relay SHR, which drops to the position shown, causing de-energization of the winding of the relay BR which likewise causes its armature to drop to the position shown, thus reducing the output of the engine and generator in the same manner as has been described previously. Bridging of the upper pair of contacts of the control relay TCR completes a circuit from the positive control bus 9 to the winding of the contactor P1 through the following conductors: 37, 39, 41, and 35. The lower armature contact of the contactor P1 is shown provided with spring fingers to provide overlapping contact action with the two lower pairs of fixed interlocking contacts, and upon energization of the winding of contactor P1 its armature will move upward, bridging the upper pair of interlocking contacts; the armature contact will remain in contact with the lower pair of interlocking contacts to maintain a connection between conductor 23 from 25 to prevent de-energization of the winding of the contactor S until the power contacts of contactor P1 are bridged by the armature power contact; then the lower pair of interlocking contacts of contactor P1 will be opened and the winding of contactor S will be de-energized and its armature will fall to the position shown. By providing this overlapping contact action, the power circuit between the generator and motors is not opened by closing of the power contacts of contactor P1 before the power contacts of the S1 contactor is opened. When the armature of the contactor S falls to the position shown, the high torque or series motor connection will be opened and the interlocking contacts of the contactor S will be bridged to connect the winding of contactor P2 between ground and the positive bus 9 through conductors 29, 33, and 27. The armature contacts of contactor P2 will then move up to bridge the power contacts and complete the high speed reduced torque or parallel motor connection with the generator G and at the same time bridging the two upper pairs of interlocking contacts. When the second pair of interlocking contacts from the top of contactor P2 are bridged an energizing circuit from the positive bus 9 to the winding of the relay SHR is completed through conductors 57, 55, 59, 45, 47, 49, 51, and 53. Energization of the winding of the relay SHR as described before causes energization of the winding of the relay BR, and accordingly the armature contacts of both of these relays move upward to bridge their upper fixed contacts to increase the output of the motor power source. The bridging of the upper pair of interlocking contacts by the armature contact of the contactor P2 establishes a connection from ground through the windings of the motor field shunting relays R1 and R2 to the left hand contact of voltage relay through conductors 61 and 22 for subsequent energization of the relays R1 and R2, which will now be described.

In order to obtain maximum locomotive speed it is necessary to decrease the excitation of the traction motors M1 and M2, which decreases their back voltage and increases the current supplied thereto and increases the motor torque to obtain increased speed therefrom. When the locomotive speed in increased to about 90 miles per hour the armature of the voltage relay V2R is moved upward, which completes the circuit established by the bridging of the upper interlocking contacts of the contactor P2 comprising conductors 61, 22, which are then connected to the positive bus 9 to energize the windings of the field shunting relays R1 and R2 causing their armatures to move upward to connect the shunting resistors r1 and r2 in shunt across the motor series field windings to provide maximum motor speed and, therefore, maximum speed of the locomotive.

For decreasing speed of the locomotive from the maximum value to a speed of 75 miles per hour the armature of the relay V2R will drop down, due to the decrease in voltage of the control generator, which causes de-energization of the windings of relays R1 and R2. The armatures of these relays drop to the position shown, removing the shunting resistors r1 and r2 to again increase the motor excitation and increase the torque of the motors M1 and M2.

Transition from the high speed reduced torque or parallel connection to the high torque and low speed or series motor connection occurs when the voltage of the control generator falls to a value corresponding to a locomotive speed of 30 miles per hour. It is well known that when the motor connections are so changed that the total back voltage generated by the motors connected in series will be doubled and the resistance of the motors in series will likewise be doubled; accordingly, the generator current will drop from the value which it was when the motors were connected in parallel. Therefore, it is unnecessary to reduce the output of the power source when changing from parallel to series motor connection by decreasing the speed and torque of the engine and decreasing the generator excitation as was done in changing from the series to parallel connection where the values in back voltage and resistance of the motors were reduced by half, which would have caused a sudden rise in generator current and imposed electrical and mechanical shocks on the engine, generator and motors if the power output of the power source had not been reduced. When, therefore, the speed of the locomotive falls to 30 miles per hour the armature of the voltage relay will drop to the position shown, and the following changes in the control circuits take place simultaneously:

Opening of the three upper pairs of contacts of the relay TCR by the armature contacts breaks the connection between conductors 37 and 39, conductors 31 and 35, and conductors 45 and 59, causing de-energization of the windings of contactor P1 and P2, which causes their armatures to drop to the position shown and to open the high speed reduced torque or parallel motor connection with the generator G. The winding of the contactor S is therefore again energized through conductors 23 and 25, the latter being connected to the positive bus which immediately re-establishes the low speed high torque or series motor connection with the generator. Energization of the winding of the relays SHR is maintained through the circuit comprising conductors 9, 57, 55, 47, and 53, established through the now bridged lower interlocking contacts of the contactor P2 and the bridged lower contacts of the relay TCR, so that no reduction in the power output of the source occurs.

The above described transition control system provides means to prevent overloading or underloading of the power units by causing automatic transition between a high torque low speed motor connection and high speed reduced torque connection and a connection to provide maximum motor and vehicle speed by means responsive to changes in the locomotive speed only, and at values of speed such that minimum changes in current from the power source to the motors occur, which materially reduces the electrical and mechanical stresses imposed on the power units and, therefore, shock on the locomotive and train.

It will be apparent that other forms of actuating means may be used instead of the electromagnetically actuated devices shown, and that by modifying the power circuits or constants thereof and the control circuits, the values of speed at which transition occurs may be adjusted to suit the operating conditions for any type of vehicle on which the present control system is used. It is well known that wheel slippage rarely occurs when the locomotive is operating at high speed with the motors connected in parallel, and as the voltage applied across the respective motors when so connected is equal in value, as is the back voltage and voltage drop across the armatures, the wheel slip relay will therefore be effective only to prevent wheel slippage in the manner described for the series motor connection. In order to prevent heating of the windings of the wheel slip relay WSR when it is ineffective, that is, when the motors are connected in parallel with the generator, the windings are shunted by closure of the parallel relays P1 and P2.

I claim:

1. The combination of an electric traction and control system for vehicles comprising a plurality of traction motors, a source of power, a plurality of power connections including connection changing means for connecting the motors in different relations to said source of power to obtain low speed and high torque or high speed reduced torque characteristics from the motors, and means responsive solely to the speed of the vehicle for controlling said connection changing means.

2. The combination of an electric traction and control system for a vehicle comprising a plurality of traction motors, a source of power including a prime mover and a generator driven thereby, means for connecting said motors to said generator in different relations to obtain high torque and low speed or high speed and reduced torque characteristics from the motors, and means responsive solely to the speed of the vehicle for controlling said first named means.

3. The combination of an electric traction and control system for a vehicle comprising a plurality of traction motors, motor excitation varying means for varying the speed of said motors, a source of power for the motors including a prime mover and a generator driven thereby, a plurality of power connections including connection transition means for transferring the connections of the motors with respect to the generator to obtain high torque and low speed or high speed and reduced torque characteristics from the motors, and control means responsive solely to the speed of the vehicle for separately controlling the connection transition means and the motor excitation varying means.

4. The combination of an electric traction and control system for a vehicle comprising a plurality of traction motors, motor excitation varying means for increasing the speed of the motors, a source of power, means for reducing the power output of said source of power, a plurality of power connections including connection transition means for transferring the connections of the motors with relation to the source of power to obtain high torque and low speed or high speed and reduced torque characteristics from the motors, and control means responsive to the vehicle speed to control the connection transition means, the means for reducing the power output of said source and said motor excitation varying means.

5. The combination of an electric traction and control system for a vehicle comprising a plurality of traction motors, motor excitation regulating means for increasing the speed of the motors, a source of power for the motors, power output regulating means for said source of power to reduce the power output thereof, a plurality of power connections including connection changing means to establish different motor connections to said source of power to obtain high torque and low speed or high speed and reduced torque characteristics from the motors, and control means responsive to the speed of the vehicle to control said connection changing means, said motor excitation regulating means and said power output regulating means so that the power output of the source will be reduced only when the connections are changed to establish the high speed reduced torque connection of the motors with the source of power.

6. The combination of an electric traction and control system for a vehicle comprising a plurality of traction motors, motor excitation regulating means to cause an increase in the speed of the motors and vehicle, a source of power including a prime mover and a generator driven thereby, output regulating means for said source of power including speed and torque regulating means for the prime mover and generator excitation regulating means, a plurality of power connections including connection transition means to transfer the motor connections with respect to the generator to obtain high torque and low speed or high speed and reduced torque characteristics from the motors, and control means responsive to vehicle speed to control all of said regulating means and said transition controlling means to change the torque characteristics of the motors inversely proportional to the vehicle speed and to reduce the power output of the source upon changing of the power connections to obtain a reduction of the torque and increase in speed of the motors.

7. The combination of an electric traction and control system for a vehicle comprising a plurality of traction motors, motor excitation reducing means, a power source including a prime mover and a generator driven thereby, output regulating means for the power source including speed and torque control means for the prime mover and generator excitation varying means, a plurality of motor circuit connections including circuit transferring means for connecting the motors in a series or parallel relation with the generator, electrical control means adapted when energized to control said motor excitation reducing means, said output regulating means for the power source and said circuit transferring means, and means responsive to the speed of the vehicle to control energization of the various electrical control means.

8. The combination of an electric traction and control system comprising a power source including a prime mover and a generator driven thereby, a plurality of traction motors, a plurality of circuit connections including circuit changing means for connecting said motors in series or parallel with the generator, output regulating means for said power source including means for regulating the speed and torque of said prime mover and generator excitation varying means, motor excitation varying means, electromagnetically controlled means for said output regulating means, said motor excitation varying means and said circuit changing means, energization control means for said electromagnetic means including control means responsive to different values of increasing and decreasing vehicle speed, and control means responsive to differential speed of said traction motors whereby said motor connections are automatically transferred between the series and parallel connections with the generator, said motor excitation varying means being controlled to provide maximum vehicle speed and said power output regulating means being controlled to reduce the power output of said power source when said motor connections are changed from series to parallel or when said motors tend to run at different speeds.

9. The combination of an electric traction and control system comprising a generator, a prime mover driven thereby, a plurality of traction motors, a plurality of power connections including electromagnetically actuated circuit connection transferring means energizable to establish a series or parallel connection of the motors with the generator, electromagnetically actuated prime mover speed and torque regulating means, electromagnetically actuated generator excitation regulating means, a control generator driven by the vehicle the voltage of which is proportional to the vehicle speed, and a plurality of relays responsive to different values of voltage of the control generator to control energization of said various electromagnetically actuated means to control said circuit connection transferring means and said prime mover and generator regulating means.

10. The combination of an electric traction and control system for a vehicle comprising a prime mover, a generator driven thereby, a plurality of traction motors for driving individual wheels of the vehicle, a plurality of power connections including electromagnetically controlled circuit connection transferring means to effect transition between a series and parallel connection of the motors with the generator, electromagnetically controlled speed, torque, and output regulating means for the prime mover and generator, electromagnetically controlled motor excitation regulating means, control means for automatically controlling energization of said various electromagnetically controlled means, said control means including a vehicle driven control generator whose voltage is proportional to vehicle speed, control means responsive to the voltage of the control generator, and a second control means responsive to differential speed and voltage generated by the traction motors for controlling energization of the electromagnetically controlled speed, torque, and output regulating means independently of the means responsive to the voltage of the control generator.

11. The combination of an electric traction and control system for a vehicle comprising a Diesel engine and a generator driven thereby constituting a power source, electromagnetically controlled power output regulating means for said power source including engine speed and torque regulating means and generator excitation regulating means, manual means for controlling energization of said electromagnetically controlled speed and torque regulating means of said engine, a plurality of series traction motors separately connected to drive the vehicle, electromagnetically controlled motor field shunting means to reduce the excitation of said motor field windings, a plurality of power connections including electromagnetically controlled circuit connection transferring means to effect transition between a series and parallel motor connection with the generator, and automatic control means responsive to changes in vehicle speed for controlling energization of said various electromagnetically controlled means to respectively cause transition of said motor connections from the series to the parallel connection upon increasing vehicle speed, at the same time rendering the manual control means ineffective to permit the operation of the engine at maximum speed and torque and to reduce the excitation of the generator during transition to cause reduction of the excitation of the motors for obtaining maximum speed operation when the motors are connected in parallel, said automatic control means for decreasing values in vehicle speed respectively controlling energization of said electromagnetically controlled means to respectively increase the motor excitation and cause transition from the parallel to the series connection.

12. In an electric traction and control system for a vehicle comprising a plurality of traction motors, a source of power for the motors, means for reducing the power output of said source of power, a plurality of power connections including connection transition means for transferring the connections of the motors with relation to the power source to obtain high torque and low speed or high speed and reduced torque motor characteristics, and control means responsive solely to the vehicle speed to control the connection transition means and the means for reducing the power output of said source.

13. In an electric traction and control system for a vehicle comprising a plurality of traction motors, a source of power for the motors, means for controlling the power output of said source, a plurality of power connections including connection transition means for transferring and retransferring the motor connections between a series and a parallel connection relation with the power source, and means responsive solely to vehicle speed to control the connection transition means and said means controlling the power output of said power source to cause a reduction in the power supplied to the motors only when the motor connection relation is changed from the series to the parallel connection relation with said source of power.

TORSTEN O. LILLQUIST.